US011743570B1

(12) United States Patent
Kahlon et al.

(10) Patent No.: US 11,743,570 B1
(45) Date of Patent: Aug. 29, 2023

(54) CAMERA PARAMETER ADJUSTMENT BASED ON FREQUENCY SHIFT

(71) Applicant: MOTOROLA SOLUTIONS, INC., Chicago, IL (US)

(72) Inventors: Haim Kahlon, Shoam (IL); Jacob Shem Tov, Jerusalem (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/663,836

(22) Filed: May 18, 2022

(51) Int. Cl.
*H04N 23/61* (2023.01)
(52) U.S. Cl.
CPC ................................. *H04N 23/61* (2023.01)
(58) Field of Classification Search
CPC ...................................................... H04N 23/61
See application file for complete search history.

(56) References Cited

U.S. PATENT DOCUMENTS

| 10,866,950 | B2 | 12/2020 | Sabripour et al. | |
|---|---|---|---|---|
| 2007/0140527 | A1* | 6/2007 | Yamamoto | G06V 20/58 382/104 |
| 2008/0231701 | A1* | 9/2008 | Greenwood | G06T 7/0008 348/148 |
| 2010/0033313 | A1* | 2/2010 | Keady | G08G 1/0965 340/425.5 |
| 2018/0081371 | A1* | 3/2018 | Bar-Tal | G05D 1/0248 |
| 2018/0288519 | A1* | 10/2018 | Min | H04R 3/12 |
| 2019/0313057 | A1* | 10/2019 | Jiang | G10L 15/22 |
| 2021/0053489 | A1* | 2/2021 | Golov | G06V 20/58 |
| 2021/0103747 | A1* | 4/2021 | Moustafa | G06F 18/25 |
| 2022/0363261 | A1* | 11/2022 | Buck | G08G 1/0965 |

FOREIGN PATENT DOCUMENTS

| KR | 101275297 B1 | 6/2013 |
|---|---|---|
| WO | 2015182965 A1 | 12/2015 |

* cited by examiner

*Primary Examiner* — Jason A Flohre

(57) ABSTRACT

A method and apparatus for operating a camera is provided herein. During operation a microphone will identify an object by receiving the sound emitted by the object. Once the object has been identified, a main frequency component of the received sound is determined, and camera parameters are adjusted based on the value of the main frequency component.

12 Claims, 3 Drawing Sheets

CAMERA PARAMETER ADJUSTMENT BASED ON FREQUENCY SHIFT

BACKGROUND OF THE INVENTION

Cameras are often distributed in public spaces in order to help identify and locate various persons and objects associated with public-safety events. It is well known that different camera configurations are required for optimal detection of various events. For example, a higher frame rate (e.g., frames per second (FPS)) is optimal for detecting high speed vehicles, while a lower FPS is optimal for typical monitoring of a public area after sunset.

Oftentimes a camera may change its settings once an object is detected within the camera's field of view (FOV), however, once a camera detects a fast-moving object within its FOV, it is often too late to change camera settings since the fast-moving object will be out of the camera's FOV prior to the camera's settings being changed. It would be beneficial if the camera settings could be changed prior to any fast-moving object entering the camera's FOV. Therefore, there is a need to change the camera settings prior to any fast-moving object enters the camera's field of view.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
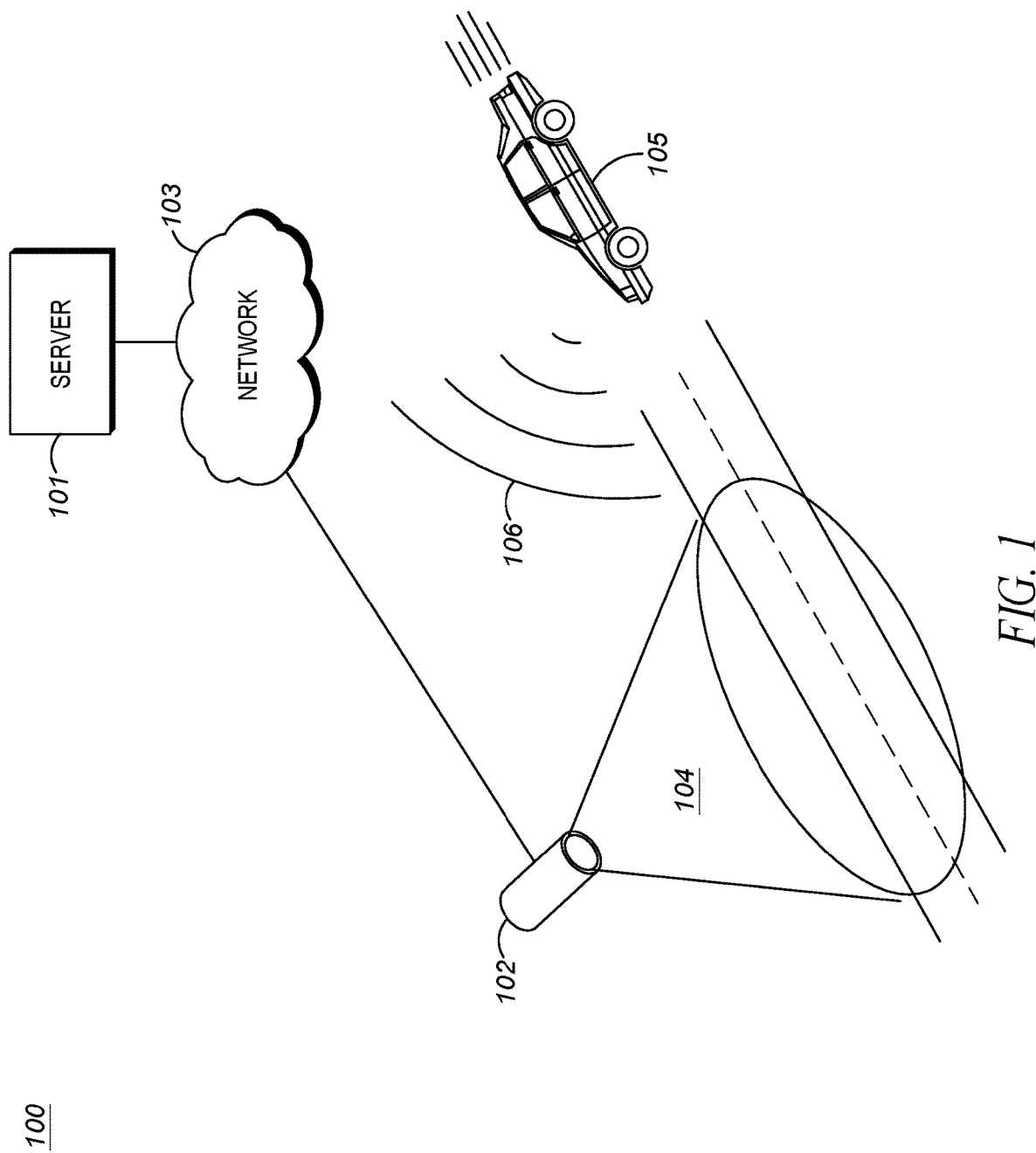
FIG. 1 illustrates a general operating environment.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for operating a camera is provided herein. During operation a microphone will identify an object by receiving the sound emitted by the object. Once the object has been identified, a main frequency component of the received sound is determined, and camera parameters are adjusted based on the value of the main frequency component.

Expanding on the above, it is known that any camera will receive any sound from a moving object at a higher frequency than emitted from the object if the object is moving towards the camera. The faster the object is moving towards the camera, the higher the frequency of the received sound. This phenomenon is called the Doppler effect, or Doppler shift. A common example of Doppler shift is the change of pitch heard when a vehicle sounding a horn approaches and recedes from an observer. Compared to the emitted frequency, the received frequency is higher during the approach. If the frequency of the emitted sound is known, and the camera is stationary, then the velocity of the moving object in the direction towards the camera can be determined based on a change in frequency ($\Delta f$) between the emitted sound and the sound received at the camera, such that.

$$\Delta f = \frac{v}{c} f_o$$

where
c is the speed of sound
$f_o$ is the emitted frequency
v is the component of velocity of the moving object toward the camera.

As is evident, if the frequency of the emitted sound is known, and the frequency of the received sound is known, then the component of velocity in the direction towards the camera can easily be determined. In one embodiment of the present invention, camera parameters are adjusted based on the Doppler shift of any received sound. In one embodiment a frame rate of a camera is adjusted such that the frame rate is increased if a Doppler shift is detected above a predetermined threshold. For example, a frame rate may increase from 25 fps to 60 fps when a Doppler shift of 300 Hz is detected. Of course, the Doppler shift may be converted to velocity, and the frame rate may increase based on velocity (e.g., when a velocity over 50 km/h is determined).

In another embodiment of the present invention, the frame rate may simply be increased based on a received frequency of a known object without the need to determine a Doppler shift. For example, an engine operating at a higher RPM emits a higher frequency than the same engine operating at a lower RPM. With this in mind, if sound from an engine is received, the camera may have its parameters adjusted (e.g., frame rate) when the main frequency component of the sound is above a predetermined threshold (e.g., 6000 Hz). Machine learning may be implemented to identify motor sounds from various vehicles and associate the main frequency component with a velocity. Alternatively, a database may be accessed to compare received engine sounds to stored acoustic fingerprints of various engines in order to determine a type of engine and a threshold frequency for changing camera parameters. For example, a Ford F150 may have a threshold engine frequency component of above 8000 Hz before any change in camera parameters are made.

With the above in mind, FIG. 1 illustrates a general operating environment 100 for the present invention. As shown, environment 100 is equipped with at least one apparatus 102 positioned to capture images/video of objects as they roam through the apparatuses' FOV 104.

Each apparatus 102 has a spatial area that it can view, referred to as a view shed or FOV 104. The FOV is based on the geographical location of the camera, mounting height, and pan-tilt-zoom capabilities of the camera while also accounting for physical obstructions of the field of view.

Server 101 is provided. Server 101 is configured to store any video obtained from apparatus 102. Server 101 may be configured to use various imaging techniques to identify an object, track the object, determine objects entering or exiting FOV 104, determine identifying characteristics of the objects, provide facial recognition, . . . , etc. In order to accomplish this, apparatus 102 is attached (i.e., connected) to server 101 through network 103 via network interface. Example networks include any combination of wired and wireless networks, such as Ethernet, T1, Fiber, USB, IEEE 802.11, 3GPP LTE, and the like. During operation, server 101 receives video feeds from apparatus 102.

As shown in FIG. 1, object 105 (in this instance, an automobile) is outside FOV 104 and emitting sound 106 with a main frequency component (e.g., an engine sound, road noise from tires, a horn, . . . , etc.). As discussed above, apparatus 102 is configured to receive sound 106, identify sound 106, determine a frequency (i.e., main frequency component) of sound 106, and adjust the parameters of a camera based on the determined frequency. Alternatively, these steps may take place within server 101.

Figure 2:
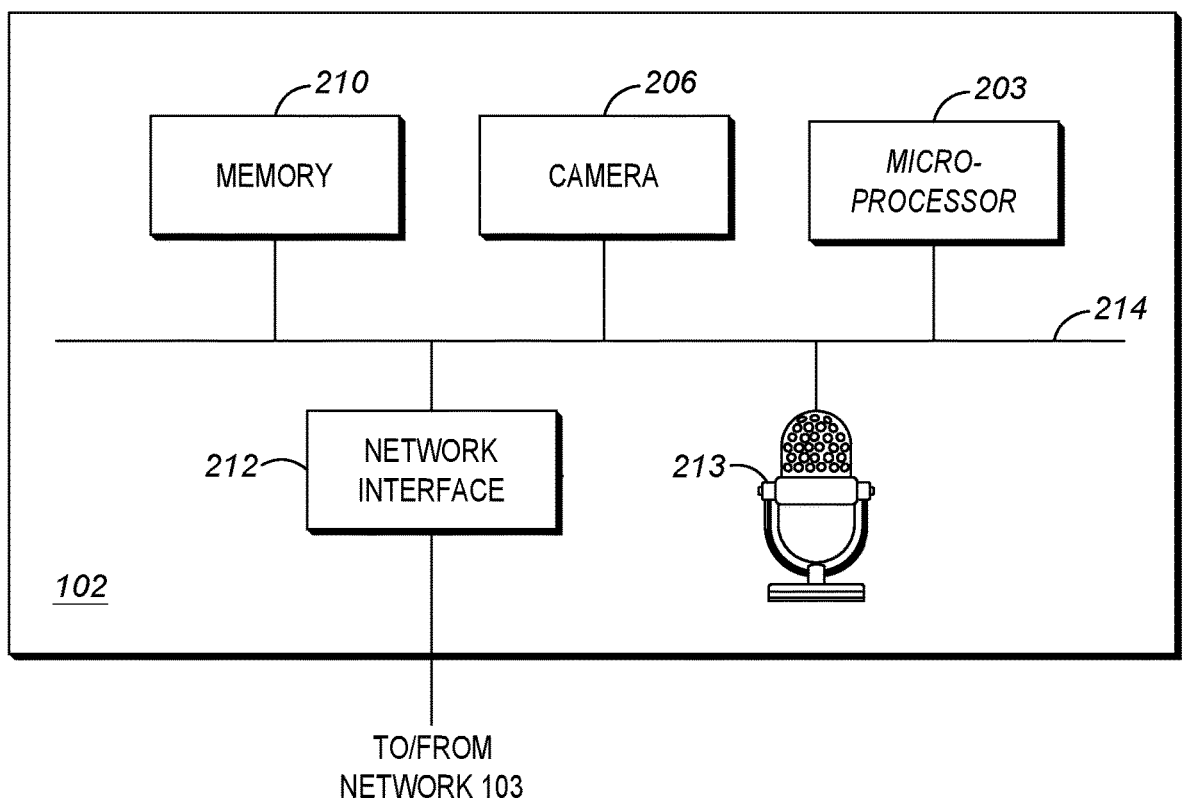
FIG. 2 is a block diagram of the camera of FIG. 1.

FIG. 2 illustrates a block diagram of apparatus 102 in accordance with some embodiments. In various examples, apparatus 102 may be any preferably stationary device capable of imaging its surroundings and detecting sounds outside a FOV of a camera. Apparatus 102 is also capable of executing instructions (sequential or otherwise) that specify actions to be taken by the apparatus. Apparatus 102 may include various components connected by a bus 214. Apparatus 102 may include a hardware processor (logic circuitry) 203 such as one or more central processing units (CPUs) or other processing circuitry able to provide any of the functionality described herein when running instructions. Processor 203 may be connected to a memory 210 that may include a non-transitory machine-readable medium on which is stored one or more sets of instructions. Memory 210 may include one or more of static or dynamic storage, or removable or non-removable storage, for example. A machine-readable medium may include any medium that is capable of storing, encoding, or carrying instructions for execution by processor 203, such as solid-state memories, magnetic media, and optical media. Machine-readable medium may include, for example, Electrically Programmable Read-Only Memory (EPROM), Random Access Memory (RAM), or flash memory.

The instructions stored in memory 210 enable apparatus 102 to operate in any manner thus programmed, such as the functionality described specifically herein, when processor 203 executes the instructions. The machine-readable medium may be stored as a single medium or in multiple media, in a centralized or distributed manner. In some embodiments, instructions may further be transmitted or received over a communications network via a network interface 212 utilizing any one of a number of transfer protocols (e.g., frame relay, internet protocol (IP), transmission control protocol (TCP), user datagram protocol (UDP), hypertext transfer protocol (HTTP), etc.).

Network interface 212 may thus enable apparatus 102 to communicate data and control information with other devices (e.g., server 101) through network 103 via wired or wireless communication. Network interface 212 may include electronic components such as a transceiver that enables serial or parallel communication. The wireless connections may use one or more protocols, including Institute of Electrical and Electronics Engineers (IEEE) Wi-Fi 802.11, Long Term Evolution (LTE)/4G, 5G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHz range, 1.8-1.9 GHz range, 2.3-2.4 GHz range, 60 GHz range, and others, including infrared (IR) communications. Example communication networks to which apparatus 102 may be connected via network interface 212 may include a local area network (LAN), a wide area network (WAN), a packet data network (e.g., the Internet), mobile telephone networks (e.g., cellular networks), and wireless data networks.

Apparatus 102 may further include one or more cameras 206 utilized to image its surroundings. Camera 206 electronically captures a sequence of video frames (i.e., a sequence of one or more still images) of a FOV, with optional accompanying audio, in a digital format at a particular frame rate. The images or video captured by the image/video camera 206 may be stored in the storage component 210, or externally at server 101 via network 103.

Finally, microphone 213 is provided. Microphone 213 provides a mechanism to translate received sound into electronic signals, and providing the electronic representation to logic circuitry 203.

During operation, memory 210 is configured to store various acoustic signatures of objects such as automobiles, motorcycles, scooters, busses, trains, or any other object capable of moving at a velocity greater than, for example, 30 km/h. An identification of a received sound is preferably accomplished by comparing the received sound with the stored acoustic signatures to determine a best match. In addition to storing a representative acoustic signature for an object, a representative value for a main frequency component for the emitted sound from the object may be stored. When microphone 213 receives a sound, the sound is sent to logic circuitry 203. Logic circuitry compares the received sound to the signatures stored in memory 210 to identify the object and obtain a value for the main frequency component of the emitted sound. The value of the main frequency component of the received sound is preferably determined by performing a Fourier transformation of the received sound. The main frequency component of the emitted sound (retrieved from memory) is compared to the main frequency component of the received sound, and the parameters for camera 206 are adjusted accordingly based on the comparison. These parameters may include, but are not limited to a frame rate, an exposure level, a pointing location, . . . , etc.

It should be noted that while the comparison between received and emitted sound may be considered a Doppler shift, in some instances, this may not be the case. For example, consider an engine that has a main emitted frequency that changes as the engine RPM changes. Technically, the emitted main frequency component of the engine changes based on RPM as well as Doppler shift. In this case, memory 210 may store the emitted engine sound having a main frequency component based on a particular RPM. The received engine sound will then have a main frequency component based on both the RPM and the Doppler shift.

With the above in mind, apparatus 102 comprises microphone 213, camera 206, and logic circuitry 203. Logic circuitry 203 is configured to receive sound from an object via the microphone, determine a value of a main frequency component of the received sound, and modify an operating parameter of the camera based on the value.

As discussed, the operating parameter may comprise a frame rate, a zoom level, or an exposure level. Additionally, the logic circuitry may be further configured to identify the object based on the received sound, determine a main frequency component of an emitted sound from the object, and compare the main frequency component of the emitted sound with the main frequency component of the received sound. As discussed, the logic circuitry may modify the operating parameters based on a difference between the main frequency component of the emitted sound and the main frequency component of the received sound.

The logic circuitry may be further configured to determine a Doppler shift of the received sound and modify the operating parameter of the camera based on the Doppler shift.

It should be noted that when the sound is no longer received, the operating parameters of the camera may be returned to a default setting. Thus, the logic circuitry can be further configured to again modify the operating parameter to a default operating parameter when the sound from the object is no longer received.

As discussed, the object may be outside the camera's FOV.

Figure 3:
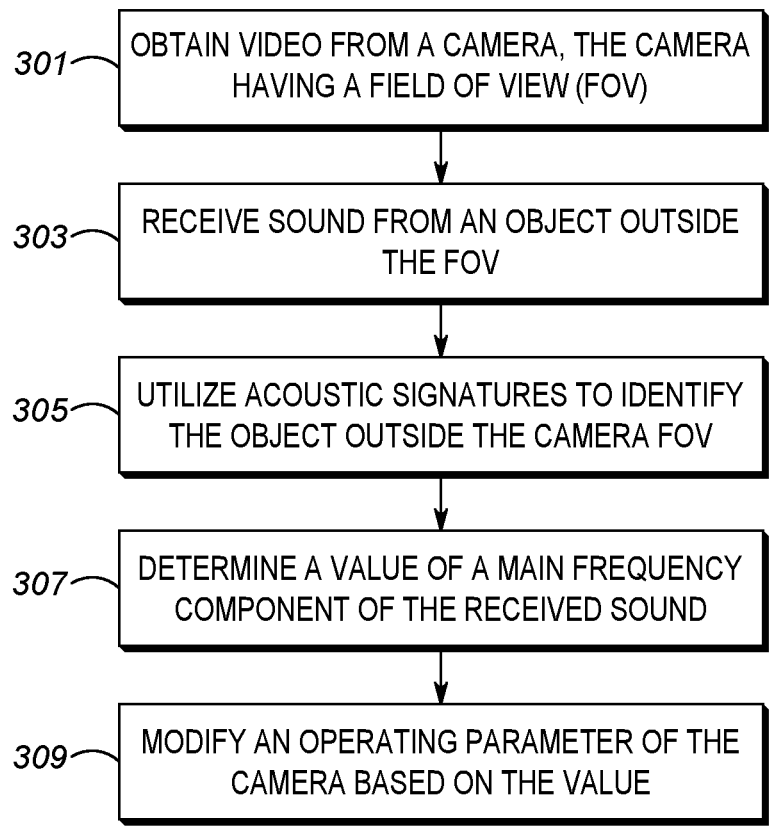
FIG. 3 is a flow chart showing operation of the camera of FIG. 2.

FIG. 3 is a flow chart showing operation of the apparatus of FIG. 2. The logic flow begins at step 301 where logic circuitry 203 obtains video from a camera, the camera having a field of view (FOV). At step 303, logic circuitry receives sound from an object outside the FOV and utilizes acoustic signatures to identify the object outside the camera FOV (step 305). At step 307, logic circuitry 203 determines a value of a main frequency component of the received sound and modifies an operating parameter of the camera based on the value (step 309).

As discussed above, logic circuitry 203 can also determine a main frequency component of an emitted sound from the object, compare the main frequency component of the emitted sound with the main frequency component of the received sound, and modify based on a difference between the main frequency component of the emitted sound and the main frequency component of the received sound.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
 a microphone;
 a camera;
 logic circuitry configured to:
  receive sound from an object via the microphone;
  determine a value of a main frequency component of the received sound;
  identify the object based on the received sound;
  determine a main frequency component of an emitted sound from the object;
  compare the main frequency component of the emitted sound with the main frequency component of the received sound; and
  modify an operating parameter of the camera based on a difference between the main frequency component of the emitted sound and the main frequency component of the received sound.

2. The apparatus of claim 1 wherein the operating parameter comprises a frame rate, a zoom level, or an exposure level.

3. The apparatus of claim 1 wherein the logic circuitry is further configured to:
 determine a Doppler shift of the received sound; and
 modify the operating parameter of the camera based on the Doppler shift.

4. The apparatus of claim 1 wherein the logic circuitry is further configured to:
 modify the operating parameter to a default operating parameter when the sound from the object is no longer received.

5. The apparatus of claim 1 wherein the object is outside a field of view of the camera.

6. An apparatus comprising:
 a camera having a field of view (FOV);
 a microphone configured to receive sound from an object outside the camera FOV;
 logic circuitry configured to:
  utilize acoustic signatures to identify the object outside the camera FOV;
  determine a value of a main frequency component of the received sound; [and] identify the object based on the received sound;
  determine a main frequency component of an emitted sound from the object;
  compare the main frequency component of the emitted sound with the main frequency component of the received sound; and
  modify an operating parameter of the camera based on a difference between the main frequency component of the emitted sound and the main frequency component of the received sound.

7. The apparatus of claim 6 wherein the operating parameter comprises a frame rate.

8. The apparatus of claim 6 wherein the logic circuitry is further configured to:
 determine a Doppler shift of the received sound; and
 modify the operating parameter of the camera based on the Doppler shift.

9. The apparatus of claim 6 wherein the logic circuitry is further configured to:
 modify the operating parameter to a default operating parameter when the sound from the object is no longer received.

10. A method comprising the steps of:
 obtaining video from a camera, the camera having a field of view (FOV);
 receiving sound from an object outside the FOV;
 utilizing acoustic signatures to identify the object outside the camera FOV;
 determining a value of a main frequency component of the received sound; [and] determining a main frequency component of an emitted sound from the object;
 comparing the main frequency component of the emitted sound with the main frequency component of the received sound; and
 modifying an operating parameter of the camera based on a difference between the main frequency component of the emitted sound and the main frequency component of the received sound.

11. The method of claim 10 wherein the operating parameter comprises a frame rate.

12. The method of claim 10 further comprising the step of:
 further modifying the operating parameter to a default operating parameter when the sound from the object is no longer received.

* * * * *